United States Patent [19]

Corsmeier et al.

[11] 4,304,523
[45] Dec. 8, 1981

[54] MEANS AND METHOD FOR SECURING A MEMBER TO A STRUCTURE

[75] Inventors: Robert J. Corsmeier; Richard H. Andersen, both of Cincinnati, Ohio

[73] Assignee: General Electric Company, Cincinnati, Ohio

[21] Appl. No.: 161,972

[22] Filed: Jun. 23, 1980

[51] Int. Cl.³ .................................... F01D 5/30
[52] U.S. Cl. .................................. 416/221; 403/316; 403/326; 29/156.8 R
[58] Field of Search ............... 403/326, DIG. 6, 261, 403/381, 316, 315, 319; 416/221, 220 R; 29/453, 156.8 R

[56] References Cited

U.S. PATENT DOCUMENTS

| | | | |
|---|---|---|---|
| 3,096,074 | 7/1963 | Pratt et al. | 416/221 |
| 3,768,924 | 10/1973 | Corsmeier et al. | |
| 3,814,539 | 6/1974 | Klompas | 416/220 X |
| 4,171,930 | 10/1979 | Brisken | |

OTHER PUBLICATIONS

Energy Efficient Engine Report to NASA, Sep. 30, 1978.
Energy Efficient Engine Review Report to NASA, Apr. 3, 1979.

Primary Examiner—Andrew V. Kundrat
Attorney, Agent, or Firm—Patrick M. Hogan; Derek P. Lawrence

[57] ABSTRACT

Means for securing a member, such as a blade retainer, to a structure, such as a disc. An annular, preferably split, retaining ring is disposed in a recess of the disc and is shaped to receive a part of the blade retainer which is also disposed within the recess thereby securing the blade retainer to the disc.

A method of securing the blade retainer to the disc is also provided and includes the steps of inserting the retaining ring into the recess and compressing the ring, inserting a part of the blade retainer into the recess and deflecting it axially, and releasing the retaining ring from compression and the blade retainer from deflection.

10 Claims, 4 Drawing Figures

MEANS AND METHOD FOR SECURING A MEMBER TO A STRUCTURE

BACKGROUND OF THE INVENTION

1. Field of the Invention

This invention relates to means for securing members to structures, and particularly to a new and improved means and a method for securing a blade retainer to a rotor disc.

2. Description of the Prior Art

The rotor blades of a turbomachine are commonly attached to the rotor disc of the machine by insertion of a dovetail of each rotor blade into a correspondingly shaped axial slot in the disc. This arrangement prevents radial and tangential movement of each rotor blade relative to the rotor disc. In order to prevent axial movement of the rotor blades, one or a plurality of blade retainers are disposed adjacent the axial slots in the rotor disc. The blade retainer must be secured to the rotor disc strongly enough to resist the forces exerted on it by the dovetails of the rotor blades, and yet it must be easily removable in order to replace the rotor blades.

Many currently-used blade retainers are secured to rotor discs by bolting. Although the bolts provide a strong connection between the blade retainer and the disc, their use also presents some problems. For example, securing and replacing the blade retainer requires corresponding installation and removal of the bolts and their nuts, an operation which can be time consuming. The bolts must be carefully torqued in order to avoid overstress at the connection, which can also be time consuming. The holes located in the blade retainer and disc and through which the bolts extend can cause fatigue cracks in the retainer and disc. Such cracks can shorten the useful life of those parts resulting in higher costs to the user. Bolt heads and nuts protruding from the disc increase the temperature of the surrounding air and increase the disturbance of the airflow, or windage, across the disc resulting in decreased engine performance.

Recently, boltless blade retainers have been introduced in order to alleviate many of the above-mentioned problems. An example of such a boltless blade retainer is shown in U.S. Pat. No. 3,768,924, issued to R. J. Corsmeier et al, assigned to the same assignee as the present invention, and the disclosure of which is incorporated herein by reference.

Although such boltless blade retainers have successfully eliminated many of the aforementioned problems, some difficulties have remained unsolved. For example, in order to secure the blade retainer to the disc, many boltless blade retainers utilize a plurality of tabs on the radially inner portion of the blade retainer which interlock into a plurality of slots on the disc. Although effective for securing the blade retainer to the disc, the fabrication of such a tab/slot arrangement requires the step of machining each of the tabs and slots, which can be time consuming and increase costs. The slots in the disc and tabs protruding from the blade retainer can increase the change of development of fatigue cracks in both the disc and blade retainer, which can shorten useful life. The tabs protruding from the blade retainer cause a disturbance of airflow, or windage, across the disc, which can reduce engine performance.

Other kinds of boltless blade retainers utilize means such as clips or shear wires to secure the blade retainer to the disc. Although these means are also effective for securing the blade retainer to the disc, they present associated problems similar to those of the tab/slot arrangement.

In view of the above-mentioned problems, it is therefore an object of the present invention to provide a structurally simple and therefore inexpensively fabricated means for securing a blade retainer to a disc.

Another object of the present invention is to increase the useful life of the blade retainer by eliminating holes or slots in it which thereby decreases the opportunity for fatigue cracks to develop.

Another object of the present invention is to reduce windage, or disturbance of the airflow, across the disc by decreasing the protrusions from the blade retainer and the disc.

Yet another object of the present invention is to provide a method for quickly and simply securing a blade retainer to a disc.

SUMMARY OF THE INVENTION

The present invention, in accordance with one embodiment thereof, comprises means for securing a member to a structure. The structure includes a recess therein and the member includes a part disposed in the recess. A retaining element is disposed within the recess, and is shaped for receiving a portion of said part of said member for thereby securing the member to the structure.

In a particular embodiment of the invention, the recess is in an axially facing side of the structure and is defined by a plurality of walls. The member includes a base and, extending from the base, an arm and a leg. The retaining element abuts a wall of the recess and receives the leg of the member.

The structure can comprise an annular, radially extending disc, the member can comprise an annular blade retainer, and the retaining element can comprise a split retaining ring.

A method is also described for securing the blade retainer to the disc. The method includes the steps of inserting the retaining ring into the recess and compressing it radially, inserting the base and leg of the blade retainer into the recess and deflecting them axially inward, releasing the retaining ring from compression, and releasing the base and leg from deflection.

BRIEF DESCRIPTION OF THE DRAWING

This invention will be better understood from the following description taken in conjunction with the accompanying drawing, wherein.

DESCRIPTION OF THE PREFERRED EMBODIMENT

Figure 1:
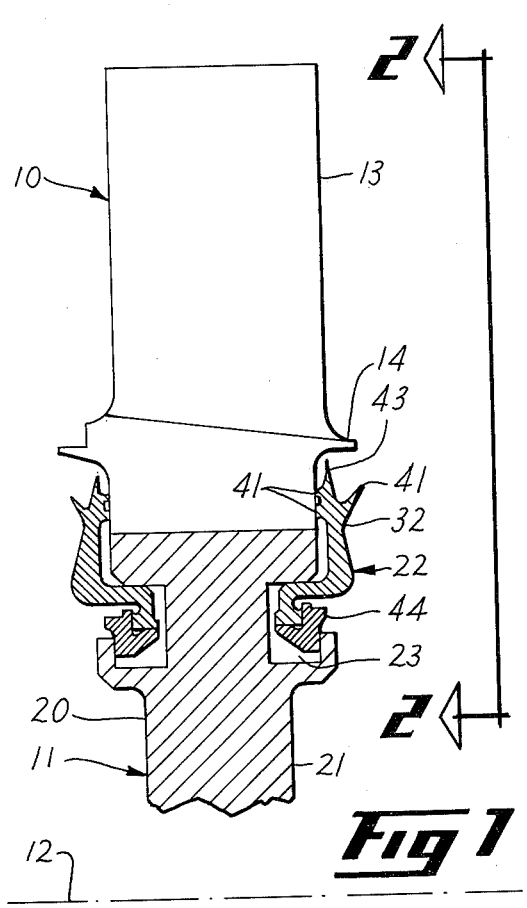
FIG. 1 is a cross-sectional view of a portion of a rotor assembly incorporating an embodiment of the present invention.
Figure 2:
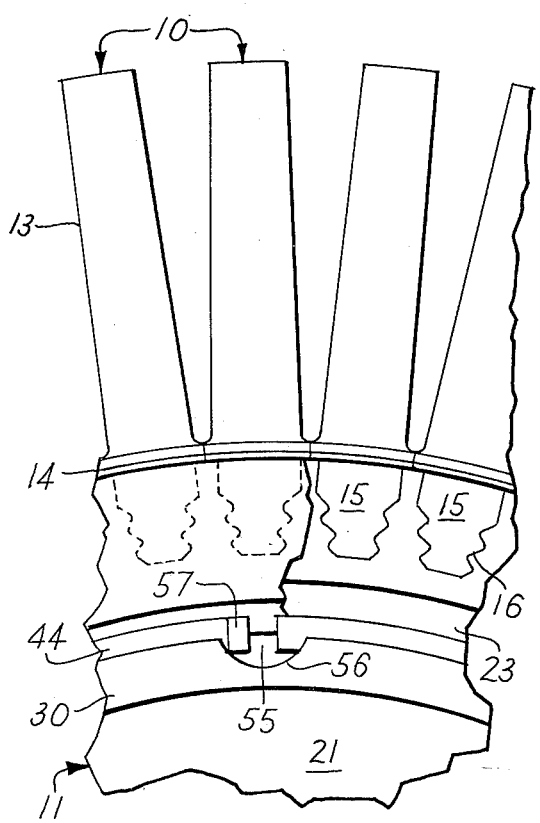
FIG. 2 is a fragmentary rear view of a portion of the rotor assembly taken along lines 2—2 of FIG. 1 and showing a split retaining ring.

Turning now to a consideration of the drawing, and in particular to FIGS. 1 and 2, there is shown means for securing a member to a structure in accordance with one embodiment of the present invention. Although this invention is described as being utilized on a rotor assembly of a gas turbine engine, it is to be understood that this is only an example and that there are many other applications in which the invention can be successfully employed.

FIGS. 1 and 2 show a plurality of rotor blades 10 attached to a structure, in this case an annular disc 11. The disc 11 extends radially from the engine longitudinal axis, depicted by the dashed line 12. As can best be seen in FIG. 2, each rotor blade 10 includes an airfoil 13, a platform 14, and a dovetail 15. Each dovetail is sized and shaped for being received by a dovetail slot 16, a plurality of which are located around the radially outer portion of the disc 11. Each dovetail slot 16 is arranged in the disc 11 such that the opening of the slot extends through either the upstream axially facing side 20 or the downstream axially facing side 21, or through both sides 20 and 21 of the disc 11. By "axially" is meant in a direction parallel to the engine longitudinal axis 12. When the dovetail 15 of each rotor blade 10 is disposed in the appropriate dovetail slot 16, the rotor blade 10 is held in place against movement radially and against movement tangentially, that is, in a direction parallel to the sides 20 and 21 of the disc 11. However, the dovetail arrangement does not prevent movement of each rotor blade in the axial direction.

In order to prevent axial movement of each rotor blade, a member, such as a blade retainer 22, is utilized. The blade retainer 22 is preferably a one piece, substantially annular member, which is disposed against a side 20 or 21 of the disc 11, adjacent the openings of the dovetail slots 16. The blade retainer 22 must be secured in some manner to the disc 11 in order for it to be able to withstand the forces exerted against it axially by the dovetails 15 of the rotor blades 10 and therefore retain the blades 10 on the disc 11. It is to be understood that although in the embodiment shown in FIG. 1 a blade retainer is secured to each side 20 and 21 of the disc 11, the blades 10 can be so arranged on the disc 11 that only a single blade retainer 22 would be required to prevent axial movement of the blades 10.

The present invention comprises means for securing a member, such as the blade retainer 22, to a structure, such as the disc 11.

The structure, or disc 11, includes a recess 23, which is preferably annular, in each axially facing side 20 or 21 against which a blade retainer is to be secured. The recess 23 is defined by a plurality of walls. As can best be seen in FIG. 3, the walls of the recess 23 include a radially inner wall 24, a radially outer wall 25, an axially inner wall 26, and an axially outer wall 27. The axially outer wall 27 preferably comprises a side of a radially extending flange 30 of the disc 11. By "axially inner" or "axially inward" is meant in an axial direction toward the center of the disc 11. By "axially outer" or "axially outward" is meant in an axial direction away from the center of the disc 11.

Figure 3:
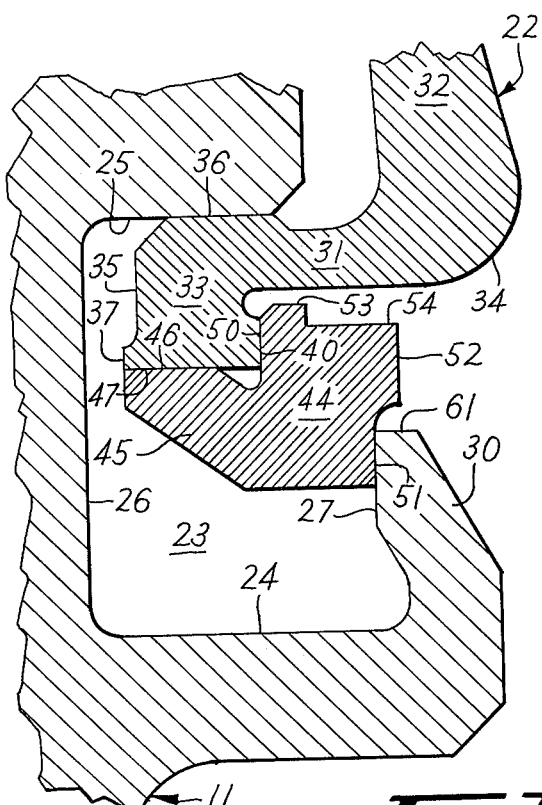
FIG. 3 is an enlarged cross-sectional view showing the blade retainer secured to the disc.

As is best seen in FIG. 3, the member, or blade retainer 22, which is to be secured to the structure, or disc 11, includes a base 31, an arm 32, and a leg 33. The base 31 preferably extends axially. The arm 32 extends substantially perpendicularly, and preferably radially outward, from a first side, or axially outer side 34, of the base 31. The leg 33 extends substantially perpendicularly, and preferably radially inward, from a second side, or axially inner side 35, of the base 31. Part of the blade retainer 22, and more specifically, the base 31 and the leg 33 is disposed in the recess 23. The radial dimension of the opening of the recess 23 between the radially outer wall 25 and the flange 30 is sufficiently large such that the base 31 and the leg 33 can be inserted therethrough, and the axial dimension of the recess 23 is sufficiently large such that the leg 33 and at least a portion of the base 31 can be disposed therein.

The radially outer edge of the base 31 includes an annular flat portion 36 for slidingly engaging the radially outer wall 25 of the recess 23. The axially inner edge of the leg 33 includes a protrusion 37 for abutting the axially inner wall 26 and thereby limiting axial movement of the blade retainer 22. The axially outer edge of the leg 33 includes an annular flat portion 40 for abutting a retaining element in a manner to be explained hereinafter.

When the member, such as the blade retainer 22, is annular, it is preferably sized such that the radial distance from the engine longitudinal axis 12 to the flat portion 36 on the radially outer edge of the base 31 is only slightly smaller than the radial distance from the engine longitudinal axis 12 to the radially outer wall 25 of the recess 23. This relationship permits the flat portion 36 of the base 31 to slidingly engage the radially outer wall 25 of the recess 23 when the member is inserted into the recess and thereby provides radial support for and restricts radial movement of the member.

As can be seen in FIG. 1, the arm 32 of the blade retainer 22 extends radially outward from the base 31 and includes a portion, such as the annular protrusions 41, which abut the side 20 or 21 of the disc 11 and the dovetails 15 of the rotor blades 10 in order to retain the rotor blades in position on the disc 11. The arm 32 can also include, for example, at least one labyrinth seal tooth 42 and can extend radially such that the radially outer edge 43 abuts or is closely adjacent the platform 14. However, other configurations of the arm 32 of the blade retainer 22 can be employed as desired without reducing the effectiveness of this invention.

Again referring to FIGS. 2 and 3, disposed within the recess 23 of the structure, or disc 11, is a retaining element, such as the substantially annular retaining ring 44. Because the retaining ring 44 and the base 31 and leg 33 of the blade retainer 22 are disposed within the recess 23, rather than protruding from the disc 11 into the airstream, windage, or disturbance of the airflow across the disc 11 is reduced. The retaining element, or retaining ring 44, is sized circumferentially such that it approximates the circumferential dimensions of the recess 23 and can therefore be disposed within the recess. The retaining element, or retaining ring 44, is shaped for receiving a portion of the leg 33 of the member, or blade retainer 22. This can be accomplished through the use of an annular, generally axially extending lip 45 which includes a radially outer surface 46. The radially outer surface 46 of the lip 45 has a shape, preferably flat, which corresponds to the shape of the radially inner end surface 47, which is also preferably flat, of the leg 33. The axially inner side 50 of the retaining ring 44 is shaped to correspond to the shape of the flat portion 40 of the axially outer edge of the leg 33. Thus, the radially outer surface 46 of the lip 45 and the axially inner side 50 of the retaining ring 44 are effective for receiving a portion of the leg 33 of the blade retainer 22.

The axially outer side 51 of the retaining ring 44 is shaped to correspond to the shape of the axially outer wall 27 of the recess 23. The retaining ring 44 is positionable within the recess 23, and when positioned as shown in FIG. 3, the axially outer side 51 is placed into abutment against the axially outer wall 27 of the recess. The retaining ring 44 preferably includes an axially extending shoulder 52, which, in the arrangement shown in FIG. 3, prevents movement of the retaining ring 44 in the radially inward direction. As will be explained hereinafter, the shoulder 52 also provides a visual indication of the proper positioning of the retaining ring 44. For reasons also to be explained hereinafter, the retaining ring 44 includes a ledge 53 on the radially outer edge 54 thereof.

As is best seen in FIG. 2, the retaining ring 44 is preferably split, as at 55. This permits radial expansion and compression of the retaining ring and thereby simplifies the insertion of the retaining ring into the recess 23. Such a split retaining ring has an inherent spring tension which attempts to expand it radially outwardly. When the retaining ring is used on a rotating structure, the split retaining ring is also able to expand radially as a result of centrifugal force applied to it. Thus, the retaining ring 44 is biased radially against the leg 33 of the blade retainer 22 and is thereby more effective for securing the blade retainer to the disc 11.

The flange 30 of the disc 11 can include at least one and preferably a plurality of scalloped cutouts 56 along the radially outer edge thereof. The scalloped cutouts 56 allow access to the radially inner side of the retaining ring 44 for reasons to be explained hereinafter. Furthermore, the scalloped cutouts can be used to prevent rotational motion of the retaining ring 44 relative to the disc 11. As is seen in FIG. 2, an axial protrusion 57, such as a weld protrusion, is added to the retaining ring, such as at the end of the retaining ring adjacent the split 55. The portion of the retaining ring having the axial protrusion 57 is disposed adjacent a scalloped cutout 56. If the retaining ring 44 begins to rotate, the protrusion 57 will engage the edge of the scalloped cutout 56 and stop the rotation.

The retaining ring 44 and the blade retainer 22 are thus structurally simple and therefore inexpensively fabricated. The materials from which they can be fabricated will vary with the environment to which they will be subjected. Examples of suitable materials are Rene' 95, a nickel-base superalloy, more particularly described in U.S. Pat. No. 3,576,681-Barker et al, for the retaining ring 44, and a nickel-base superalloy, commercially available as INCONEL 718 for the blade retainer 22. However, these are only listed as examples and other materials can be utilized as desired.

Figure 4:
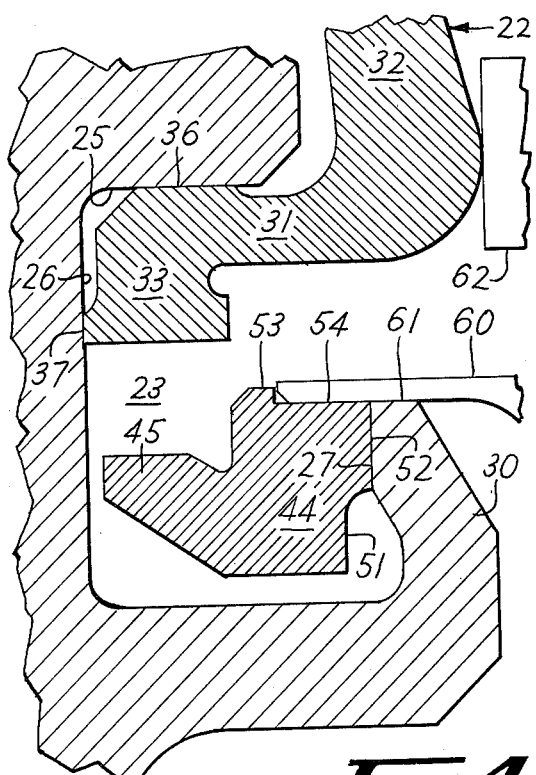
FIG. 4 is an enlarged cross-sectional view showing the base and leg of the blade retainer deflected axially inward and the retaining ring compressed radially inward.

A method for assembling the above-described apparatus is as follows:

The diameter of the retaining ring 44, which is split, is expanded by means which can exert a radially outwardly directed force upon the retaining ring. The retaining ring 44 is inserted into the recess 23 of the disc 11 and the expanding force is removed. As can be seen in FIG. 4, the retaining ring 44 is then compressed radially by means which exert a radially inwardly directed force. One example of such means is a compression tool 60 which is assembled over the retaining ring 44. The axially inner end of the compression tool is inserted until it is adjacent the ledge 53, and the tool is tightened radially. The retaining ring 44 is compressed until the radially outer edge 54 is flush or even, with the radially outer edge 61 of the flange 30.

The base 31 and the leg 33 of the blade retainer 22 are then inserted into the recess 23 such that the flat portion 36 of the base 31 slidingly engages the radially outer wall 25 of the recess 23. The blade retainer is moved axially inwardly until, as is seen in FIG. 1, a portion of the arm 32, such as the protrusions 41, abuts a side 20 or 21 of the disc and the dovetails 15 of the rotor blade 10. As seen in FIG. 4, means are then used to deflect the base 31 and the leg 33 further axially inward until the protrusion 37 of the leg 33 abuts the axially inner wall 26 of the recess 23. One example of such means is a clamping tool 62 which, when tightened, exerts an axially inwardly directed force against the blade retainer 22.

As is shown in FIG. 3, the retaining ring 44 is then released from compression whereby, due to the inherent spring tension caused by its being split, it expands radially outwardly within the recess 23. Axial inward movement of the retaining ring 44 is prevented by the lip 45 being disposed closely adjacent the axially inner wall 26 of the recess 23. However, as the shoulder 52 of the retaining ring moves radially outward past the flange 30, the retaining ring moves axially outward until the axially outer side 51 of the retaining ring abuts the axially outer wall 27 of the recess 23. If necessary, the retaining ring 44 can be urged radially outward by the insertion of a tool, such as a screw driver, through the scalloped cutout 56 (shown in FIG. 2) and against the radially inner surface of the retaining ring. The retaining ring expands radially outwardly until the radially outer surface 46 of the lip 45 abuts the radially inner end surface 47 of the blade retainer 22. The shoulder 52 being positioned radially outward of the radially outer edge 61 of the flange 30 provides a visual indication of the proper positioning of the retaining ring 44.

The means, such as the clamping tool 62 shown in FIG. 4, axially deflecting the base 31 and the leg 33 of the blade retainer 22 is then released. Returning to FIG. 3, the blade retainer 22 moves, or springs back, in an axially outward direction until the flat portion 40 of the leg 33 abuts the axially inner side 50 of the retaining ring 44. In this arrangement, the retaining ring 44 has thereby received a portion of the leg 33 of the blade retainer 22. Radial and axial movement of the blade retainer 22 are prevented by the retaining ring 44 and the walls of the recess 23, and the blade retainer is thereby secured to the disc 11.

The blade retainer 22 is unsecured, or removed, from the disc 11 by reversing the above-described method. That is, again referring to FIG. 4, means, such as the clamping tool 62, are used to deflect the base 31 and the leg 33 of the blade retainer 22 axially inwardly until the protrusion 37 abuts the axially inner wall 26 of the recess 23. Means, such as the compression tool 60, are used to compress the retaining ring 44 radially inwardly until the radially outer edge 54 of the retaining ring is flush with the radially outer edge 61 of the flange 30. The means, such as the clamping tool 62, is removed from the blade retainer 22 and the blade retainer is removed from the recess 23 of the disc 11. Blades 10, which are attached to the disc 11, can then be quickly and easily replaced and the blade retainer resecured to the disc 11. Or, if permanent disassembly is desired, after the blade retainer 22 is removed from the disc, the means, such as the compression tool 60, is removed and the retaining ring 44 is extracted from the recess 23.

As is seen from the above, the blade retainer 22 can be quickly and easily secured to and replaced on the disc 11, and the means for doing so eliminates the need for holes and slots and thereby decreases the opportunity for fatigue cracks to develop in either the disc 11 or the blade retainer 22. As such, the useful lives of both the blade retainer and the disc are increased.

It is to be understood that this invention is not limited to the particular embodiment disclosed, and it is intended to cover all modifications coming within the true spirit and scope of this invention as claimed.

What is claimed is:

1. Means for securing an annular blade retainer to an annular radially extending disc, wherein said disc includes in an axially facing side thereof an annular recess defined by radially inner and outer walls, an axially inner wall, and an axially outer wall defined by a side of a radially extending flange of said disc, comprising:
   (a) said annular blade retainer including an axially extending base, an arm extending radially outward from an axially outer side of said base, and a leg extending radially inward from an axially inner side of said base, said base and said leg being disposed in said recess and said base being in sliding engagement with said radially outer wall of said recess; and
   (b) an annular retaining ring being disposed in said recess and being positionable therein for placing an axially outer side of said retaining ring into abutment against said axially outer wall, said retaining ring including a generally axially extending lip for together with an axially inner side of said retaining ring receiving a portion of said leg for thereby securing said blade retainer to said disc.

2. The securing means of claim 1 wherein said retaining ring is split for thereby permitting radial expansion and compression thereof.

3. The securing means of claim 1 wherein said axially outer side of said retaining ring includes a shoulder for limiting radial movement thereof.

4. The securing means of claim 1 wherein said arm of said blade retainer includes at least one seal tooth extending therefrom.

5. The securing means of claim 1 wherein said radially extending flange includes at least one scalloped cutout therein.

6. The securing means of claim 5 wherein said retaining ring includes a protrusion therefrom for engaging an edge of said scalloped cutout and thereby preventing rotation of said retaining ring.

7. A method of securing an annular blade retainer to a disc using an annular split retaining ring, wherein said blade retainer includes a base, an arm, and a leg, said disc includes an annular recess in an axially facing side thereof, and said retaining ring is shaped for receiving a portion of said leg and sized for being disposed within said recess, comprising the steps of:
   (a) inserting said retaining ring into said recess;
   (b) compressing said retaining ring radially;
   (c) inserting said base and said leg of said blade retainer into said recess until a portion of said arm abuts a side of said disc;
   (d) deflecting said base and said leg further axially inwardly;
   (e) releasing said retaining ring from compression; and
   (f) releasing said base and said leg from axial deflection.

8. The method of claim 7 wherein the radial compression of said retaining ring in step (d) is accomplished by means of a compression tool.

9. The method of claim 7 wherein the axially inward deflection of said base and said leg in step (d) is accomplished by means of a clamping tool.

10. A method of securing an annular blade retainer to a radially extending disc using an annular split retaining ring, wherein said blade retainer includes a base, an arm, and a leg having an axially extending protrusion thereon, said disc includes an annular recess in an axially facing side thereof defined by a plurality of walls, the axially outer wall being defined by a radially extending flange having a radially outer edge, and said retaining ring includes a radially outer edge and is shaped for receiving a portion of said leg and sized for being disposed within said recess, comprising the steps of:
   (a) inserting said retaining ring into said recess;
   (b) compressing said retaining ring radially until said radially outer edge thereof is flush with said radially outer edge of said flange;
   (c) inserting said base and said leg of said blade retainer into said recess until a portion of said arm abuts a side of said disc;
   (d) deflecting said base and said leg further axially inward until said protrusion abuts a wall of said recess;
   (e) releasing said retaining ring from compression; and
   (f) releasing said base and said leg from said axial deflection.

* * * * *